March 16, 1937. W. R. BLOH 2,074,249
ADVERTISING APPARATUS
Filed Nov. 6, 1934 4 Sheets-Sheet 1
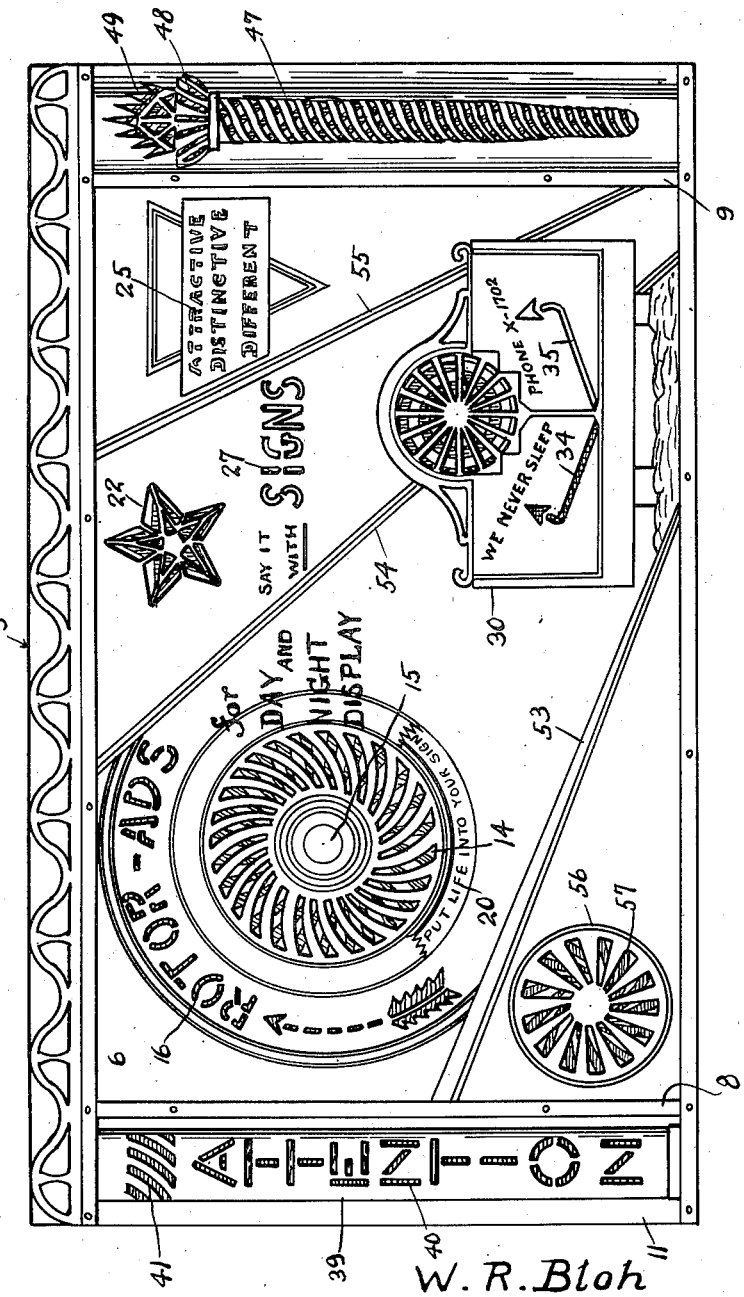
Inventor
W. R. Bloh
By Clarence A. O'Brien
Attorney March 16, 1937. W. R. BLOH 2,074,249
ADVERTISING APPARATUS
Filed Nov. 6, 1934 4 Sheets-Sheet 2
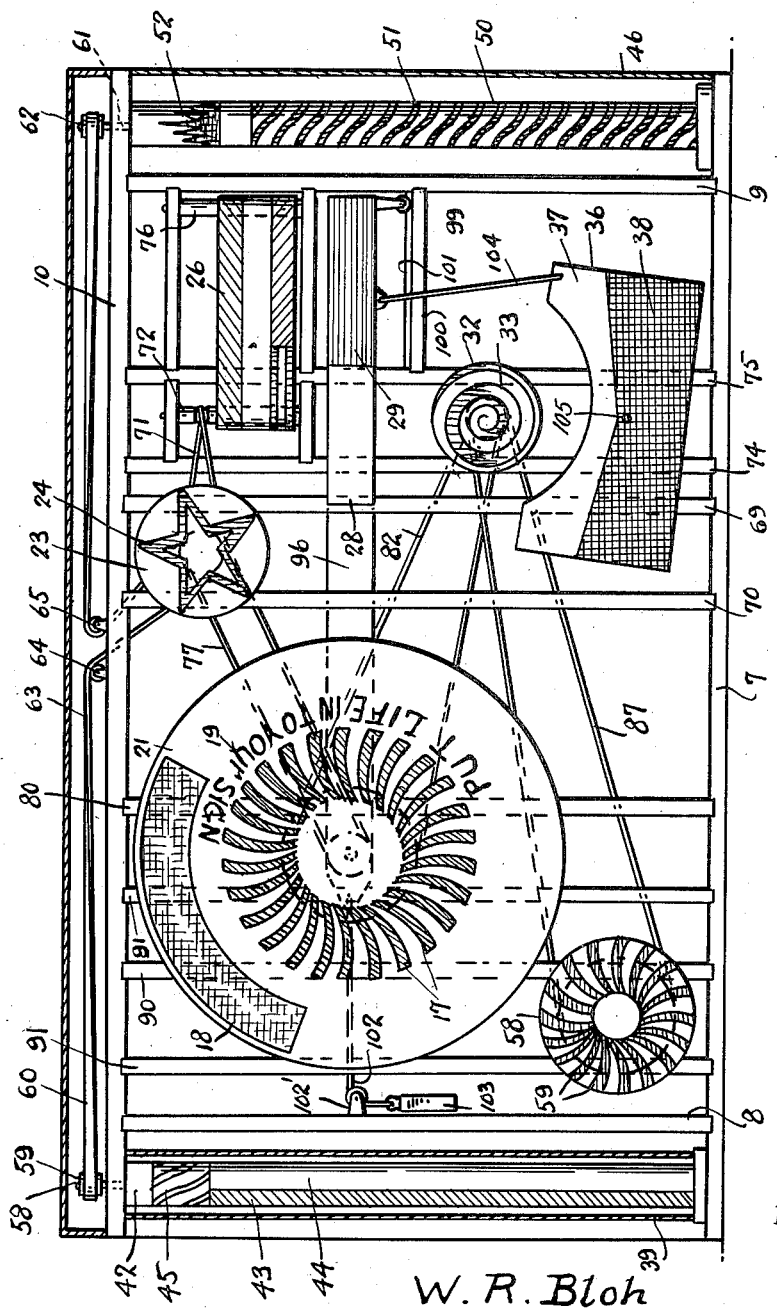
Inventor
W. R. Bloh
By Clarence A. O'Brien
Attorney

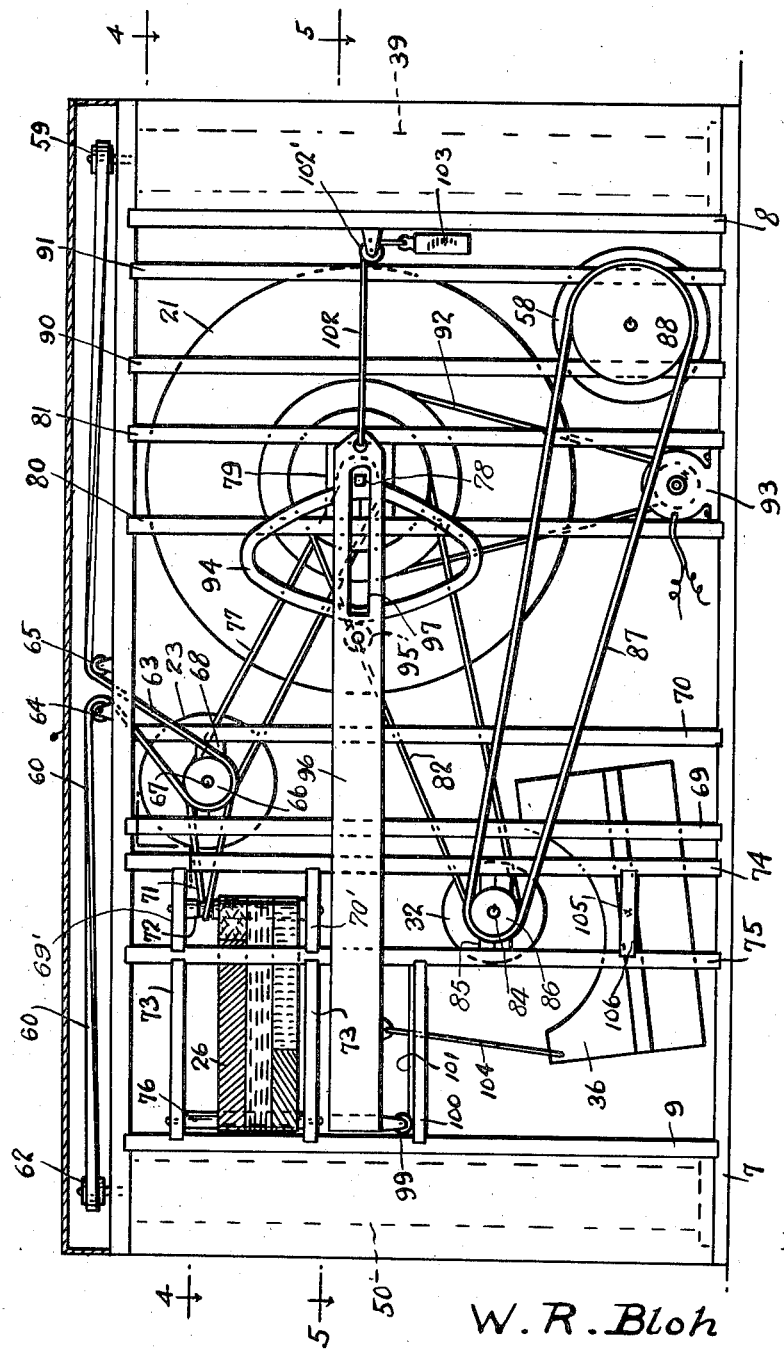

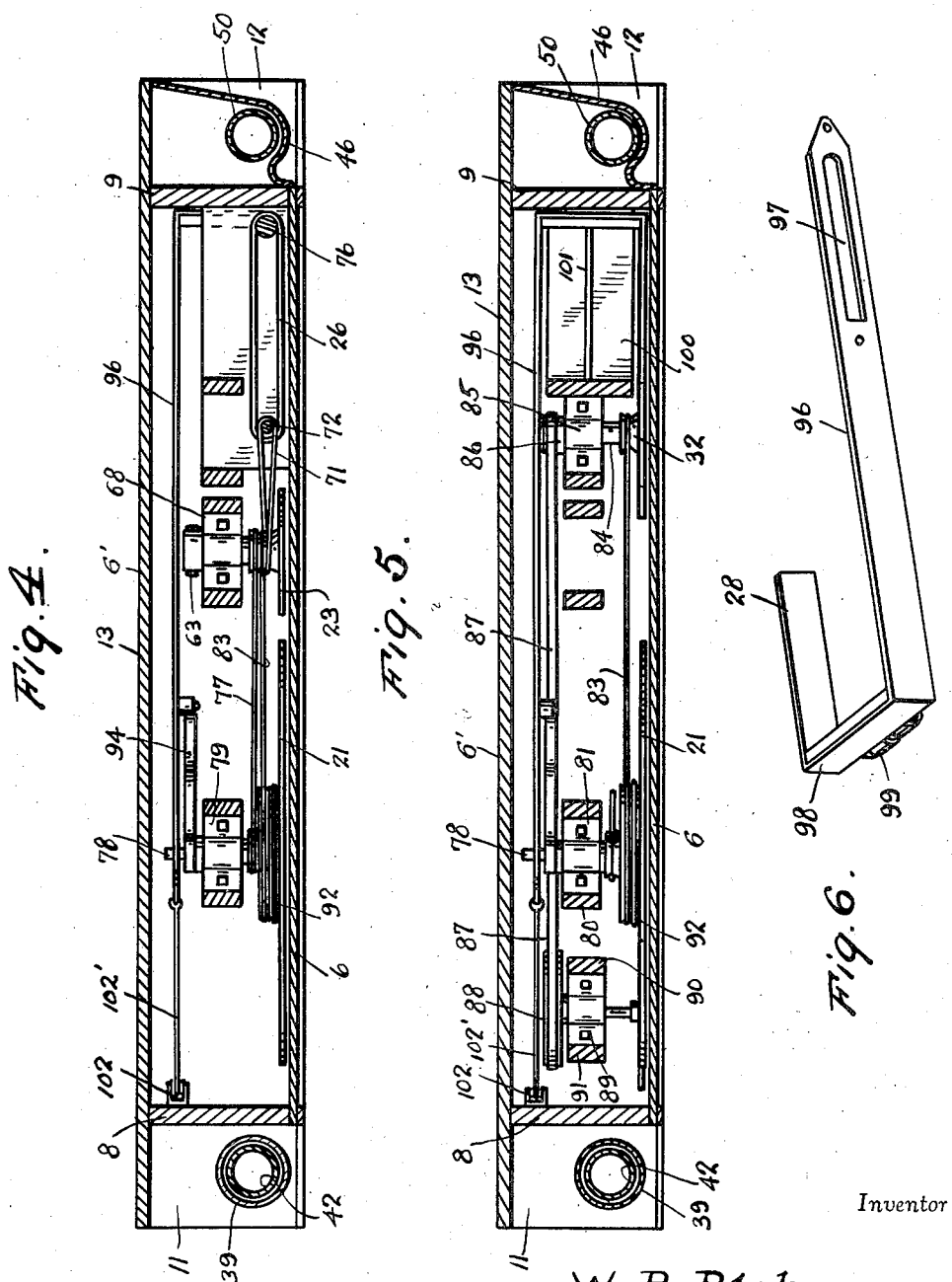

Patented Mar. 16, 1937

2,074,249

UNITED STATES PATENT OFFICE 2,074,249

ADVERTISING APPARATUS

William Reinhard Bloh, Giddings, Tex.

Application November 6, 1934, Serial No. 751,781

1 Claim. (Cl. 40—133)

My invention relates generally to advertising apparatus and particularly to advertising apparatus having moving elements which by motion and cessation of motion attract the eye to information variously disposed on the apparatus, and an important object of the invention is to provide apparatus of the character indicated which is extraordinarily effective in attracting and holding the attention.

Another important object of the invention is to provide apparatus of the character indicated which embodies new and novel means for attracting and holding the attention of an observer.

Another important object of the invention is to provide in an apparatus of the character indicated a relatively stationary member carrying the advertising information and having transparent parts or holes behind which operate moving elements which cooperate with the transparent or translucent areas or holes in producing changing and variegated apearance which attract and hold the attention of the observer.

Another important object of the invention is to provide in an apparatus of the character indicated above novel means for simultaneously and/or concomitantly driving the various moving elements at speeds and in directions of motion which are coordinated to produce the desired changing and variegated appearance effects.

Other objects and advantages of my invention will be apparent from a reading of the following description in connection with the drawings, wherein for purposes of illustration I have shown a preferred embodiment of my invention.

In the drawings:—

Figure 1 is an elevational view of the front of an embodiment of the invention.

Figure 2 is a longitudinal vertical sectional view taken through Figure 1 showing the front part of the moving elements.

Figure 3 is a back view of Figure 2.

Figure 4 is a horizontal sectional view taken approximately on the line 4—4 of Figure 3 and looking downwardly in the direction of the arrows.

Figure 5 is a horizontal sectional view taken through Figure 3 approximately on the line 5—5 and looking downwardly in the direction of the arrows.

Figure 6 is a perspective view of an oscillating slide constituting one of the moving elements.

Referring in detail to the drawings the numeral 5 refers generally to the embodiment used herein to illustrate the invention, comprising an open-back casing comprising the front plate 6 and the frame including the base 7, the end walls 8 and 9 and the top 10. The ends of a back plate 6' extend beyond the ends 8 and 9 as indicated in Figures 4 and 5 so as to define niches 11 and 12 respectively.

Although different arrangements for producing the changing and variegated appearances may be made by changing the character and arrangement of the openings or holes or transparent areas in the front plate 6 which are not here described, those about to be described and shown in the drawings will illustrate an arrangement exemplifying the invention.

In the plate 6 in the upper left hand part as shown in Figure 1 may be arranged a series of spiral slots 14 around a representation of a center such as that shown at 15 and circumferentially and concentrically around this may be arranged openings 16 in the form of stencil letters or other signs. Disposed behind the openings 14 and 16, respectively, are the oppositely spirally arranged color areas 17 and the segmental color portion 18, respectively, while between these may be circumferentially arranged series of letters or words 19 which are to appear at spaced intervals in the opening 20 in the front plate 6 the ends of the opening being jagged as shown. The color portions 17 and 18 and the letters or words 19 are carried on a rotating disk 21 which is mounted and moved in a manner to be subsequently described herein.

In the upper part of the plate 6 to the right of the arrangements just described may be a star formation 22 composed of appropriate openings or translucent or transparent areas corresponding to a desired formation of a star and behind this is rotatably supported a disk 23 having thereon color areas in the outline of a star as shown in Figure 2 which when rotated will cause the star 22 to have a scintillating, changing appearance.

To the right of the star 22 may be arranged stenciled lettering 25 constituted by holes through the plate 6 or by translucent or transparent areas, behind which passes longitudinally a movable element 26 having bands of different colors as shown in Figure 2 which is moved behind the lettering 25 to give this lettering a changing and variegated appearance.

To the left of the lettering 25 and below the star 22 is a series of openings 27 which may also be translucent or transparent areas corresponding in form to the information to be conveyed, and behind this is mounted a longitudinally moving element 28 having bands or striations 29 of different colors or shades of colors which when in motion gives the sign portion 27 a variegated and changing appearance.

In the lower right hand part of the plate 6 may be a panel generally designated 30 which includes a grating 31 formed by triangular radially arranged slots through the plate 6 or by correspondingly arranged translucent or transparent portions behind which rotates the disk 32 having spirally arranged color areas 33 thereon which when the disk is rotating give an appearance of movement both centrifugal and centripetal with respect to the center of the grating 31.

On the panel 30 are arrow openings 34 and 35 which are oppositely and similarly arranged and which point to matter of advertising. Behind the openings 34 and 35 is rockably mounted a moving element 36 which may have the upper part 37 of one color and the lower part 38 of a contrasting color so that when the element 36 is pivoted in one direction one of the arrow openings will appear of one color and the other of the contrasting color, an exchange of exhibition of these colors being procured through tilting the element 36 in opposite directions.

Vertically arranged in the niche 11 is an outer cylinder 39 which has in the front face thereof central openings or the equivalent which are generally designated 40 which form a sign or visible information and may include spirally arranged openings 41 at the top thereof.

Within the outer cylinder 39 is an inner cylinder 42 which is provided with different color areas 43, 44, and spiral contrasting color bands 45 which appear behind the letters 40 and the slots 41, respectively, as the inner cylinder 42 is rotated relative to the outer cylinder 39.

The niche 12 has closing the major portion thereof a curved wall 46 which has in its front vertically spaced series of spiral openings 47 together with series of converging openings 48, surmounted by irregular openings 49, these openings being assembled into a single concept such as that of the flaming sceptre concept shown in Figure 1. In the niche 12 and behind the openings 47, 48, and 49 is a rotating cylinder 50 which has thereon the oppositely spiralling striations 51 of different colors and the irregularly differently colored portions 52 which pass before the described openings and give an appearance of motion and change of color to the sceptre.

The arrangement of motion and the timing of the various moving elements is such that the eye is caught by any one or more of the changing sign elements and directed to and held upon the information which it is the purpose of the apparatus to particularly point out to the public. For directing the attention to different parts of the sign there are used direction streamers or lines such as those illustrated at 53, 54, and 55, together with a rosette 56 composed of a plurality of circumferentially spaced triangular openings 57 back of which rotates the disk 58 having thereon the spiral color striations 59 which give the impression of motion within the slots 57 either centrifugal or centripetal. The various kinds of elements may be so arranged and coordinated in respects of arrangement, location and speed of change and variegation that the attention of the observer may be drawn at once to the main information or conducted from a particular part of the sign such as the cylinder 39 to the largest changing wheel constituted by the slots 14 and in a right hand direction, or vice versa.

The purpose of such an arrangement is to provide a distinctive and attractive attention compelling sign which is effective in the day time as well as in the night time whether lighted or not. It will be obvious that by conventional arrangements illumination may be supplied to the different moving elements so that their appearance at night will be adequately bright and clear; and because such conventional arrangements of illumination are readily available I am not unnecessarily complicating this disclosure by doing more than calling attention to their availability herein.

It will be observed that the top 10 and the base 7 overhang or extend beyond the ends 8, 9 to provide the supporting media for the rotating cylinders 42 and 50, the cylinder 42 having an axle 58 journaled through an opening in the top 10 and having on its upper end a pulley 59 over which a belt 60 is trained, and the cylinder 50 having an axle 61 including a pulley 62 above the top 10 over which another flight of the belt 60 is trained as shown in Figure 2 and also in Figure 3. The belt 60 has a flight 63 which is trained over idler pulleys 64 and 65 which are longitudinally spaced on the top 10, the flight 63 passing through an opening in the top 10 and over the pulley 66 which is fixed to the axle 67 journaled in the bearing 68 which is supported between the vertical frame members 69 and 70, the axle 67 having also fixed thereto the star disk 23 already mentioned. Also trained over the pulley 66 in a different groove thereof forwardly of the belt flight 63 and on the opposite side of the bearing 68 is a belt 71 which is trained over and drives a roller 72 which is rotatably mounted between horizontal supports 69' and 70' mounted between and by vertical frame members 74 and 75 as shown in Figure 3, the roller 72 having trained thereover the striated belt 26 already referred to which is also trained over an idler roller 76 supported similarly to the roller 72 between the horizontal members 73, the belt 26 operating behind the lettering openings 25 in the front plate. Also trained over the pulley part of the disk 23 as shown in Figure 4 is the belt 77 which is trained also over a groove of the pulley part of the large disk 21 which is mounted on an axle 78 supported in a bearing 79 mounted between two uprights 80 and 81 which are fixed to the top 10 and the base 7, respectively, as are the vertical members 69 and 70 and 74 and 75. A belt 82 is trained over the pulley part of the disk 21, that is over a portion thereof of larger diameter and also over the pulley part of the disk 32 which is mounted on an axle 84 supported in a bearing 85 mounted between the uprights 74 and 75 and having on its opposite end a pulley 86 over which is trained the drive belt 87 which is trained over the pulley portion 88 of the rosette disk 58 which is supported in a bearing 89 fastened between the uprights 90 and 91. A drive belt 92 is trained over the pulley of an electric or any suitable motor 93 and also over the pulley part of the disk 21 so as to drive this disk and also the other moving elements through the belt system described. On the axle 78 of the largest disk 21 and fixed thereto is an elliptical cam member 94 whose outer periphery works against a pin or roller 95 on the front side of a slide generally designated 96 which has at one end a slot 97 riding on the axle 78 and at its opposite end a U-shaped part 98 whose bottom contains rollers 99 which ride on a shelf 100 and on opposite sides of a track 101 thereon. A cord or cable 102 is attached to the right hand end of the slide as seen in Figure 3 and is trained over a pulley 102' mounted on the end 8 and has thereon a weight 103 which tends to pull the slide 96 toward the right in Figure 3 against the action of the cam 94 for the purpose of giving the slide right hand motion when the condition of the cam 94 permits, the cam operating only in consonance with the disk 21.

The leg 28 of the slide has the color striations 29 as indicated in Figure 2 which are moved back and forth horizontally behind the lettering 27 as already pointed out.

Connected to the U-shaped part of the slide is a connecting link 104 which depends as shown in Figure 3 and is connected to the right hand upper extremity of the rocking member 36 which is pivoted as indicated at 105 on a member 106 supported between and by the vertical members 74 and 75, so that the member 36 will tip in opposite directions as the slide is oscillated back and forth by the operation successively of the cam 94 and of the weight 103.

Although I have shown and described herein a preferred embodiment of my invention, it is to be definitely understood that I do not desire to limit the application of the invention thereto, and any change or changes may be made in the materials and in the structure and arrangement of the parts, within the spirit of the invention and the scope of the subjoined claim.

What is claimed is:—

A display apparatus of the character described comprising a front panel having groups of openings therein defining attractive symmetrical designs, a pair of horizontal shafts mounted behind the panel, each of the shafts being located rearwardly of a corresponding design on the panel, pulleys on the shafts, an endless belt trained over the said pulleys, drive means for one of the shafts, each of the said shafts being provided with a disk on its end adjacent its corresponding panel design, said disks having ornate indicia on the panel sides thereof disposed in intersecting relation to the openings of the corresponding panel designs.

WILLIAM REINHARD BLOH.